(12) United States Patent
Chang

(10) Patent No.: US 7,649,587 B2
(45) Date of Patent: Jan. 19, 2010

(54) TILTABLE LCD HOLDER

(75) Inventor: Hung-Chieh Chang, Shijr (TW)

(73) Assignee: Clientron Corp., Taipei Hsien (TW)

( * ) Notice: Subject to any disclaimer, the term of this patent is extended or adjusted under 35 U.S.C. 154(b) by 355 days.

(21) Appl. No.: 11/711,156

(22) Filed: Feb. 27, 2007

(65) Prior Publication Data
US 2008/0204621 A1 Aug. 28, 2008

(51) Int. Cl.
*G02F 1/1333* (2006.01)
(52) U.S. Cl. ........................................................ 349/58
(58) Field of Classification Search ................... 349/58; 361/681
See application file for complete search history.

(56) References Cited
U.S. PATENT DOCUMENTS 5,915,658 A * 6/1999 Sheng ................... 248/346.06
6,912,120 B2 * 6/2005 Kim et al. .............. 361/679.06
7,389,963 B2 * 6/2008 Cho et al. .................... 248/159

* cited by examiner

*Primary Examiner*—Thoi V Duong
(74) *Attorney, Agent, or Firm*—Rosenberg, Klein & Lee

(57) ABSTRACT

A tiltable LCD holder comprises a base, a fixing device and at least one support device. The base has a platform on an upper end thereof. The fixing device has holes for being fixed on the platform of the base. The fixing device has two upward bended ends having a respective screw hole for screwing a respective screw bolt thereinto. The support device is connected to an object by one end thereof. The support device has screw holes on the other end for being movably coupled with the screw holes formed on the upward bended ends of the fixing device, whereby the object can be tiltable over a wide angle range to provide a steadily positioned visual angle.

6 Claims, 4 Drawing Sheets

TILTABLE LCD HOLDER

FIELD OF THE INVENTION

The present invention relates to a tiltable LCD holder that has a platform on a base and a fixing device and a support device on the platform to be tiltable over a wide angle range and to be suitable for use in a LCD monitor, a computer-holding rack or the like.

BACKGROUND OF THE INVENTION

Due to the development of technology and the increasing consciousness regarding environment protection, the conventional CRT (Cathode Ray Tube) monitors, which are large, heavy and are possible to generate the excessive irradiation after long-term use, are progressively replaced by the LCD (Liquid Crystal Display) monitors for health protection, wherein the LCD monitors are featured by its high brightness, lightness and thinness. In addition, there is no possibility that the LCD monitors generate the excessive radiation. Besides, the LCD monitors have a competitive price.

However, the conventional LCD holders (not shown) are mostly designed for supporting the weight of the LCD monitors. Accordingly, the conventional LCD holders are integrally coupled with the LCD monitors or designed to allow the LCD monitors to be 360 degrees rotatable by using a rotatable plate. Accordingly, the LCD monitors are tiltable over a small angle range mostly less than 15 degrees, causing much inconvenience in use. Accordingly, the conventional LCD holders do not meet the requirements.

In view of this, the present inventor makes diligent studies in providing general public with a multifunctional tiltable LCD holder according to the motive of the present invention.

SUMMARY OF THE INVENTION

It is an object of the present invention to provide a tiltable LCD holder that has a platform on a base and a fixing device and a support device on the platform to be tiltable over a wide angle range and to provide a steadily positioned visual angle, thereby increasing its practicability and convenience.

It is another object of the present invention to provide a tiltable LCD holder that movably couples a fixing device to a support device by screw bolts to allow an object that connects thereto to be tilted up or tilted down to 90 degrees for providing best field of vision and thereby increasing overall practicability.

In order to achieve the foregoing objects, a tiltable LCD holder is comprised of a base, a fixing device and at least one support device. The base has a platform on an upper end thereof. The fixing device has holes for being fixed on the platform of the base. The fixing device has two upward bended ends having a respective screw hole for screwing a respective screw bolt thereinto. The support device is connected to an object by one end thereof. The support device has screw holes on the other end for being movably coupled with the screw holes formed on the upward bended ends of the fixing device, whereby the object can be tiltable over a wide angle range to provide a steadily positioned visual angle.

The aforementioned and other objects and advantages of the present invention will be readily clarified in the description of the preferred embodiments and the enclosed drawings of the present invention.

DETAILED DESCRIPTION OF THE PREFERRED EMBODIMENT

Figure 1:
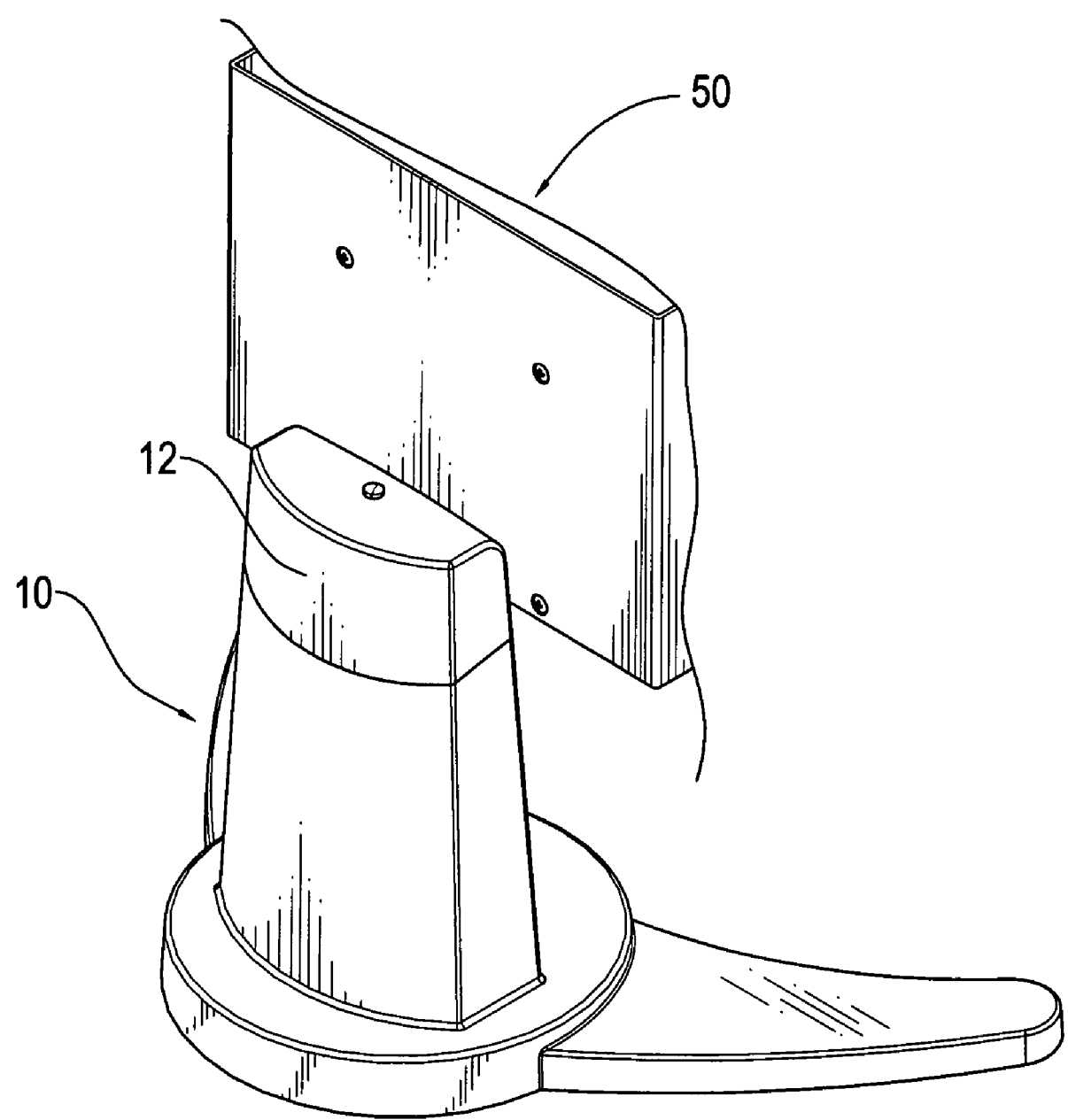
FIG. 1 is a schematic, elevational view of the present invention.
Figure 2:
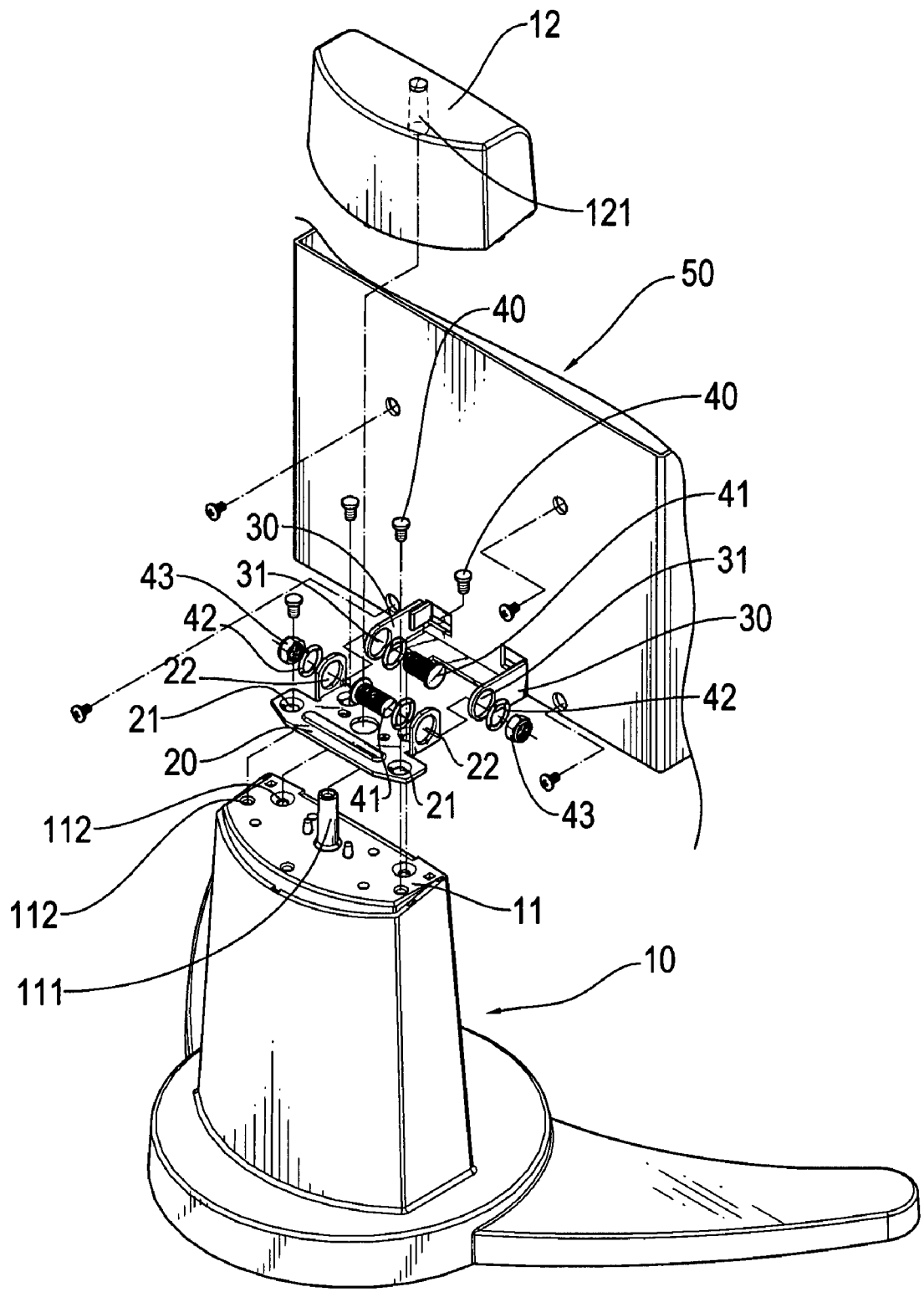
FIG. 2 is a schematic, elevational view showing the components of the present invention.

Referring to FIGS. 1 and 2, a tiltable LCD holder of the present invention comprises a base 10, a fixing device 20 and at least one support device 30. The base 10 has a platform 11 on the upper end in a position depending on a required height. The base 10 further has a paw-shaped lower portion to steadily bear the weight without the risk of shaking. The base 10 further has a cover 12. The cover 12 is hollow and has a positioning tube 121 mounted thereinside. The platform 11 of the base 10 has a positioning pillar 111 mounted thereon, wherein the positioning pillar 111 can be coupled to the positioning tube 121 of the cover 12 to protect the tiltable LCD holder. The fixing device 20 has several holes 21 and the platform 11 also has several holes 112 in positions corresponding to the holes 21 of the fixing device 20 so that the fixing device 20 can be fixedly screwed onto the platform 11 of the base 10 by screw bolts 40. In addition, the fixing device 20 has two upward bended ends having a respective screw hole 22 formed thereon for screwing a respective screw bolt 41 thereinto. The fixing device 20 is a plate made of a metal material and has a shape complying with the shape of the platform 11 of the base 10 for enhancing the support performance. In addition, one end of the support device 30 is connected to an object 50, and the other end of the support device 30 has two screw holes 31 to be movably coupled with the screw holes 22 formed on the upward bended ends of the fixing device 20 by using screw bolts 41, screw nuts 43 and gaskets 42. Accordingly, the tiltable LCD holder is tiltable over a wide angle range so as to adjust and position the visual angle of the object 50 depending on the condition of use.

Figure 3:
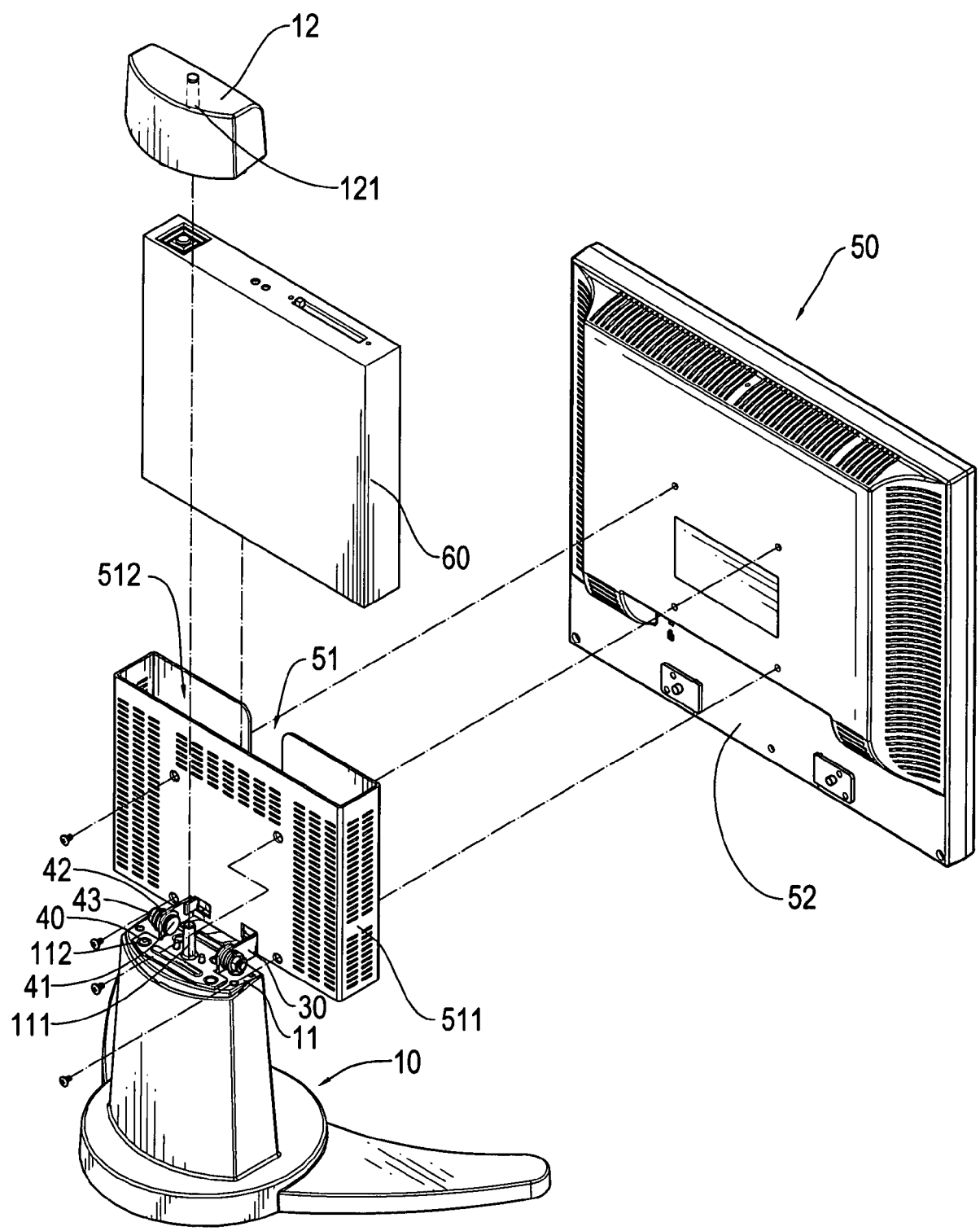
FIG. 3 is a schematic diagram showing a first preferred embodiment of the present invention.
Figure 4:
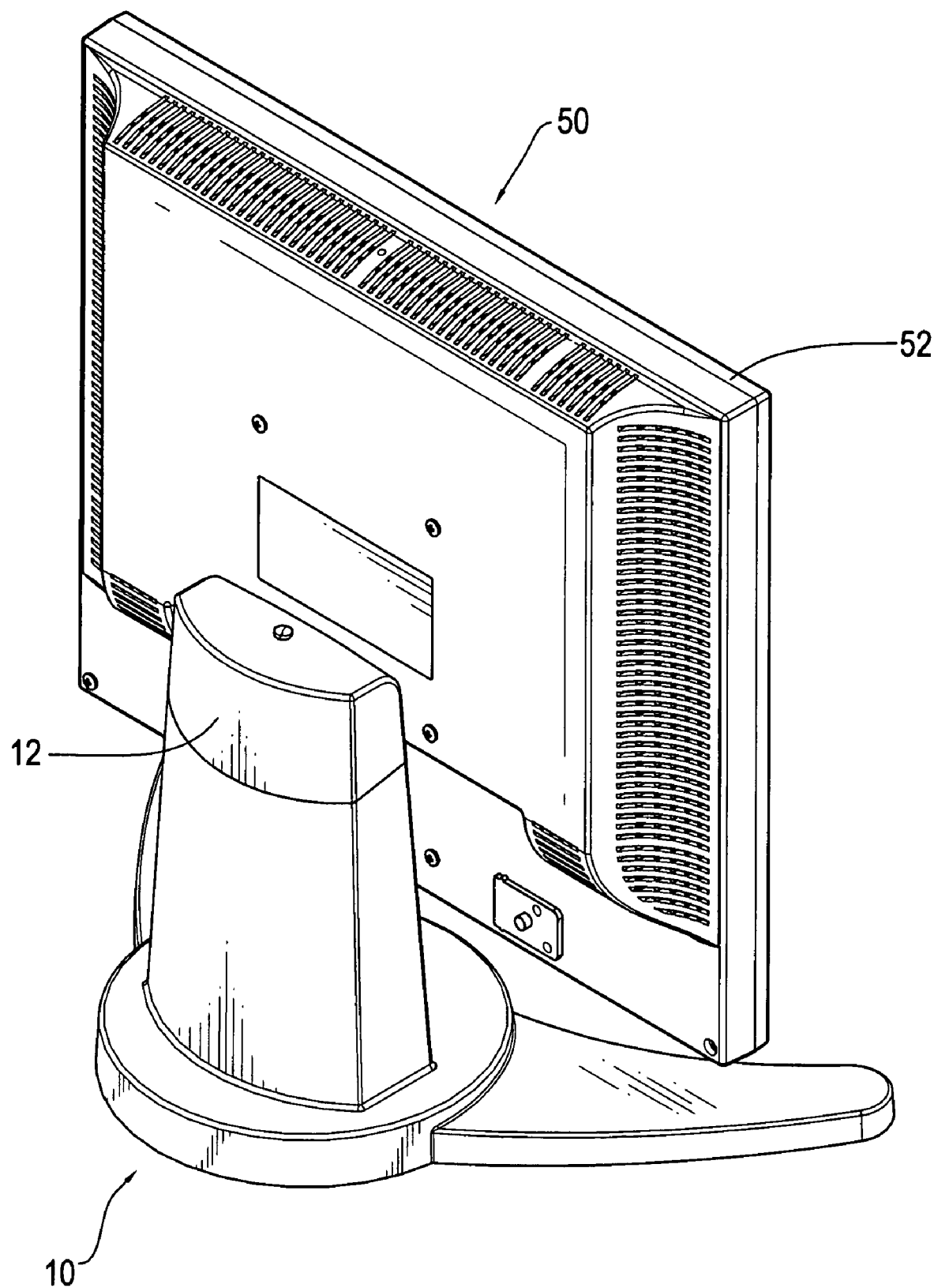
FIG. 4 is a schematic diagram showing a second preferred embodiment of the present invention.

Referring to FIGS. 3 and 4, two preferred embodiments of the present invention are shown. In the first preferred embodiment, one end of the support device 30 is connected to the object 50 and the object 50 is a computer-holding rack 51, as shown in FIG. 3. The computer-holding rack 51 is formed by bending a frame 511 to form a holding chamber 512, wherein the frame 511 is bent for forming two plates on the other side to allow the holding chamber 512 to be expandable to facilitate the insertion of a computer 60 thereinto. The frame 511 has holes on the center of one side thereof, wherein the holes are utilized for coupling the backside of a LCD monitor to the frame 511. The holes are in compliance with a VESA standard, wherein the holes on four corners of the frame 511 are spaced 75 mm×75 mm or 100 mm×100 mm. In the second preferred embodiment, the object 50 is a LCD monitor 52, as shown in FIG. 4, wherein the support device 30 is connected to the backside of the LCD monitor 52 so that the LCD monitor 52 can be tilted up and down to 90 degrees to provide best field of vision, thereby increasing overall practicability.

In accordance with the foregoing description, the present invention has the following practical advantages:

1. The tiltable holder of the present invention comprises a base, a fixing device and at least one support device to be tiltable over a wide angle range for holding different objects and thereby providing practicability and convenience.

2. The fixing device and the support device can be movably screwed together by the screw bolts to allow the object that connects thereto to be tilted up and down to 90 degrees for providing best field of vision and thereby increasing overall practicability.

To sum up, the present invention is capable of achieving the anticipated objects described above. Therefore, this application is filed according to the patent law.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments, which do not depart from the spirit and scope of the invention.

What the invention claimed is:

1. A tiltable LCD holder, comprising:
    a base having a platform on an upper end thereof, said platform having a positioning pillar mounted thereon;
    a fixing device having a plurality of holes for being fixed on said platform of said base and two upward bended ends having a respective screw hole for screwing a respective screw bolt thereinto;
    at least one support device connected to an object by one end thereof and having a plurality of screw holes on the other end for being movably coupled with said screw holes formed on said upward bended ends of said fixing device, whereby said object can be tiltable over a wide angle range to provide a steadily positioned visual angle; and a hollow cover having a positioning tube mounted thereinside, said platform of said base being covered by said hollow cover, said positioning tube of said cover being coupled to said positioning pillar of said base to protect said tiltable LCD holder.

2. A tiltable LCD holder according to claim 1, wherein said fixing device is a plate made of a metal material to enhance the support performance.

3. A tiltable LCD holder according to claim 1, wherein said screw holes on said upward bended ends of said fixing device and said screw holes on said other end of said support device can be screwed together by a plurality of screw bolts, a plurality of screw nuts, and a plurality of gaskets to allow said object to be tiltable over a wide angle range.

4. A tiltable LCD holder according to claim 1, wherein said one end of said support device is connected to said object, and said object is a LCD monitor.

5. A tiltable LCD holder according to claim 1, wherein said one end of said support device is connected to said object, and said object is a computer-holding rack.

6. A tiltable LCD holder according to claim 5, wherein said computer-holding rack is formed by bending a frame to form a holding chamber, wherein said frame is bent for forming two plates on the other side to allow said holding chamber to be expandable to facilitate the insertion of a computer thereinto.

* * * * *